(12) United States Patent
Brzana

(10) Patent No.: US 8,744,536 B2
(45) Date of Patent: Jun. 3, 2014

(54) HOLDING DEVICE FOR A MOBILE TELEPHONE

(75) Inventor: Jacek Brzana, Rowne (PL)

(73) Assignee: Bury Sp.z.o.o., Mielec (PL)

( * ) Notice: Subject to any disclaimer, the term of this patent is extended or adjusted under 35 U.S.C. 154(b) by 154 days.

(21) Appl. No.: 13/456,273

(22) Filed: Apr. 26, 2012

(65) Prior Publication Data

US 2012/0276962 A1 Nov. 1, 2012

(30) Foreign Application Priority Data

Apr. 29, 2011 (DE) .......................... 10 2011 100 540

(51) Int. Cl.
*H04M 1/00* (2006.01)
(52) U.S. Cl.
USPC .................................... 455/575.1; 248/372.1
(58) Field of Classification Search
USPC ........... 455/575.1–575.9; 361/679.01–679.61
See application file for complete search history.

(56) References Cited

U.S. PATENT DOCUMENTS

| | | | |
|---|---|---|---|
| 6,491,276 B1 | 12/2002 | Belliveau | |
| 2006/0166722 A1* | 7/2006 | Gu | 455/575.8 |
| 2009/0117946 A1 | 5/2009 | Tomasini et al. | |
| 2010/0124957 A1* | 5/2010 | Williams et al. | 455/575.6 |
| 2013/0244735 A1* | 9/2013 | Bury | 455/573 |

FOREIGN PATENT DOCUMENTS

| | | |
|---|---|---|
| DE | 10 2010 005 270 | 7/2001 |
| DE | 102 60 951 | 7/2004 |
| DE | 10 2004 062 177 | 10/2007 |
| EP | 1604868 A1 | 12/2005 |

OTHER PUBLICATIONS

Kamblad, Torbjorn. "Speck HoldSter—Universal holster review." TouchGen. http://www.touchgen.net/speck-holdster-universal-holster-review. Dec. 14, 2010.*
Run Around Tech. "Speck HoldSter Universal Quick Access Holster." YouTube. http://www.youtube.com/watch?v=T-OxHxNorcU. Oct. 2, 2010.*

* cited by examiner

*Primary Examiner* — Kashif Siddiqui
(74) *Attorney, Agent, or Firm* — Whitham Curtis Christofferson & Cook, PC

(57) ABSTRACT

The inventions refers to a holding device (1) for a mobile telephone, the holding device (1) having a mounting device (2) for accommodating the mobile telephone, the mounting device (2) comprising a contact surface (4) and at least two holding components (6) which protrude from the contact surface (4), the holding device (1) being characterized by the fact that at least one of the holding components (6) has an adjusting device for adjusting a length L, at which the holding component (6) protrudes from the contact surface (4) and wherein the receiving device (2) can be put in a hold position and a release position, wherein the receiving device (2) is arranged to interact positively with a mobile telephone mounted in the holding device (1) when the receiving device (2) is in the hold position.

15 Claims, 19 Drawing Sheets

HOLDING DEVICE FOR A MOBILE TELEPHONE

FIELD OF THE INVENTION

The invention relates to a holding device for a mobile telephone, the holding device having a mounting device for accommodating the mobile telephone, the mounting device comprising a contact surface and at least two holding components which protrude from the contact surface.

BACKGROUND

A holding device of this sort is, for example, described in DE 10 2004 062 177 B4. In this description of an embodiment of a holding device, the contact surface of the mounting device comprises the back wall of a housing unit. Two jaws protrude laterally from this; their distances are adjustable according to the width of the mobile telephone to be mounted in the device. The lateral jaws are both equipped with padding and remain in place whilst mounting and removing the mobile telephone. As a result, only a friction connection occurs between the jaws and the mounted mobile telephone, which holds the telephone in place.

In order to avoid a shift parallel to the contact surface, the holding device described has an additional vertical jaw, which is also padded. The distance between this third vertical jaw and the two lateral jaws can also be adjusted so that the dimensions can be adapted to the length and width of each mobile telephone.

However, it is a disadvantage that only a friction connection occurs when mounting a mobile telephone. As a result, the paddings on the individual jaws are pushed together so that they exert a force upon the mounted telephone, due to their elastic properties. However, after long usage, the paddings take on the particular form of the mounted mobile telephone, so that the holding power decreases over time. Furthermore, with a frictional connection, this can be always be resolved with enough force without any damage to the holding device, so that the mounted mobile telephone can be disconnected from the holder while the holding device is being used, particularly in motor vehicles, when the vehicle drives over potholes or other obstacles, for example.

Furthermore, according to the prior art, a mobile telephone mounted in the holding device can be slid or shifted within the holder without it leaving the holder. However, mobile telephones in this type of holding device are often simultaneously charged or, for example, connected with an integrated handsfree device in a vehicle. In this way, electrical contacts and connectors are connected with each other, which would be subjected to a considerable mechanical strain during a shifting of the mobile telephone within the holder.

SUMMARY

Therefore invention aims to solve the problem of developing a holding device according to the preamble, so that mobile telephones with various dimensions, in particular smart phones, can be held securely and stably in the holding device, and can be mounted and removed easily and quickly from the holding device.

The invention solves the problem at hand via a holding device according to the preamble which is characterized by the fact that at least one of the holding elements has an adjusting device for adjusting the length L at which the holding component protrudes from the back wall, and by the fact that the mounting device can be put in a hold position and a release position, wherein the mounting device in the hold position interacts positively with a mobile telephone mounted in the holding device.

The fact that a mobile telephone mounted in the holding device is positively held in the hold position of the mounting device and not by friction contact, as in the prior art, means that the holding or bearing is considerably more stable. Unlike with a friction connection, a positive connection cannot be broken by means of an increased force without any damages. Even when driving over pot holes or other obstacles the mobile telephone is therefore securely held in the mounting device of the holding device. In order to remove the mobile telephone from the holding device, the mounting device is put in the release position. This may be achieved when, for example, the holding components which interact positively with the mobile telephone in the holding position have a greater distance from one another in the release position, so that the mobile telephone can be easily removed.

The holding components protrude from the contact surface of the mounting device. The depth of the mounting device is defined by the length L at which they protrude from the back wall. It is then therefore defined how thick a mobile telephone to be mounted can be in order to be able to be placed in the mounting device. However, should a mobile telephone be considerably thinner than the length L of the individual holding components, the mobile telephone cannot leave the mounting device because of the positive interaction, as long as it is in the hold position. However, it can move within the mounting device in a direction perpendicular to the contact surface, i.e. along the length L. In this case, electric connectors or contacts would be further subjected to a considerable mechanical strain. For this reason, at least one of the holding components has an adjusting device with which the length L, i.e. the extension of the mounting device in a direction perpendicular to the contact surface, can be adjusted. In this way the depth of the mounting device can be adapted to the thickness of the mobile phone to be mounted. Only then, because of this adjustment together with the positive interaction, is a movement of the mobile telephone within the mounting device no longer possible, or only to such a limited extent, that damage or excessive stress on plug connections is actively prevented, as long as the mounting device is in the hold position.

According to a preferred embodiment, the mounting device has four holding components which are arranged on four corners of the mounting device. In this case each holding component in the hold position of the mounting device encompasses a corner of the mobile telephone to be mounted. In this way, the buttons which are often arranged on the side surfaces of mobile telephones or control units or other operating components are not affected and remain accessible to the user. Furthermore, the fact that the four corners are encompassed allows for a particularly secure holding of the mobile telephone to be mounted. Alternatively, three holding components could be provided, two of which are arranged on corners of the mounting device and one, for example, on a shorter side, such as the lower side. In this case, a positive interaction of the holding component in the hold position of the mounting device with the mobile telephone to be mounted is also guaranteed. However, since, for example, charging sockets or plug connectors are often arranged on the side surfaces of mobile telephones and Smart phones, this arrangement of the holding components would mean that one or several of these operating components or connecting slots would no longer be accessible.

It is advantageous when each of the holding components of the mounting device has an adjusting device. In this way the length L, and thus the depth of the mounting device, for each of the holding components can be separately and individually adjusted. This is especially advantageous if the mobile telephone to be mounted has, for example, a different thickness on various corners. Through the individual adjusting of the length L for each individual holding component, this can be taken into account. However, it can also be an advantage that a number of holding components has a common adjusting device by means of which the length of this number of holding components can be adjusted together. Mobile telephones often have a different thickness, for example, in the display area than in the control buttons area. Should, for example, four holding components be provided which are arranged on the four corners of the mounting device and thus on the four corners of the mobile telephone to be mounted, the two holding components which are arranged in the display area of the mobile telephone should be adjusted to the same height. This is preferably done with a common adjusting device, which can save time during the adaptation of the mounting device or the holding device to the desired mobile telephone.

The adjusting device preferably comprises a knurled-head screw. This type of screw makes it quick and easy to adjust the length L of a particular holding component as desired. Furthermore, the manufacture is simple and cost-effective, and the number of the component parts to be used is strictly limited.

It has emerged that it is particularly advantageous if the width of the mounting device is adjustable. Alternatively or additionally to this, the length of the mounting device can also be adjustable. In this way the flexibility of the holding device is further increased, since it can not only be adapted to the thickness of the mobile telephone to be mounted, but also mobile telephones of varying width and length can be accommodated. For all of these mobile telephones, an individual adjustment of length and/or width of the mounting device is possible, as well as the depth of the mounting device, so that an optimal placement with minimal freedom of movement of the mobile telephone is guaranteed, as long as the mounting device is in the hold position.

In order to prevent an inadvertent transfer of the mounting device from the hold position to the release position, a locking device is preferably provided which locks the mounting device in the hold position. This can, for example, be unlocked by an actuating component if the mounting device should be changed from the hold position into the release position. In this way it is ensured that an inadvertent opening of the mounting device, for example due to a driving manoeuvre or other vibrations, is actively avoided.

The holding device preferably comprises a universal antenna. Additionally or alternatively to this a mini USB connection can also be provided.

In a preferred arrangement of the present invention the holding device has an attachment on one the sides opposite to the mounting device for fixing the holding device. In this way the mounting device is designed to be pivoted around a pivot axis relative to this attachment. With this attachment, the holding device can be fixed, for example, in the interior of a vehicle, so that it is possible for a person in the vehicle to look at and, if necessary, use a mobile telephone in the holding device. Smart phones in particular have a relatively large display and can be used not only for telephoning purposes, but also, for example, to play films or similar activities. As a result, it is conceivable that mobile telephones of this sort are used for particular applications in an upright position and for other applications in a horizontal position. As the mounting device can be pivoted relative to the attachment with which the holding device is secured, it is possible to allow for both positions of the mobile telephone in the holding device.

The pivot axis preferably runs perpendicular to the contact surface. In most arrangements, this means that the pivot axis also runs perpendicular to the display of the mobile telephone when the mobile telephone is in the holding device.

In a preferred embodiment, the holding device preferably has snap-in components so that the mounting device can be fixed in at least one pivoting position relative to the attachment. In this way, it is guaranteed that, as long as the mounting device is in this (at least one) pivoting position, it is not moved out of this pivoting position because of vibrations which occur during travel, such as abrupt driving and particularly braking manoeuvres, or driving over curbs or potholes. This allows for a simple and comfortable use of a mobile telephone in the holding device in these situations as well.

It has emerged that it is particularly advantageous if the mounting device can be fixed in three pivoting positions relative to the attachment, wherein the various pivoting positions comprise a neutral position, as well as a first pivoting position at +90° to the neutral position and a second pivoting position at −90° to the neutral position. Should a mobile telephone in the neutral position of the mounting device be arranged in an upright position in the holding device, for example, it is guaranteed, via the first and second pivoting positions which are fixed at 180° relative to one another, that the mobile telephone can be used in both conceivable positions in the holding device or it's mounting device without having to remove the mobile telephone from the holding device. To this effect, the snap-in components can be small protrusions which are, for example, spring-loaded and protrude from the surface of a rotary component. In the pivoting positions, in which the mounting device can be fixed, these protrusions move into purpose made recesses of a second rotary component. Should the mounting device now be fixed relative to the attachment, the protrusions must be pushed into their recesses against the spring force, so that a rotation of the two rotary components against one another is possible. Should the next fixed position be reached, the protrusions snap back into the purpose made recesses, due to the spring load, and locking occurs. In this way it is guaranteed that the necessary stability is ensured in a fixed pivoting position and simultaneously a further fixing is possible without the help of tools or significant power.

It is advantageous if there is at least one connection for a communication device and/or a power supply on the attachment; the battery of a mobile telephone in the mounting device, for example, can thus be charged or a communication device which may, for example, be part of the vehicle, can be used via the mobile telephone.

DESCRIPTION OF THE DRAWINGS

With the aid of a drawing an embodiment of the present invention will be explained in more detail.

What is shown is.

DESCRIPTION

Figure 1:
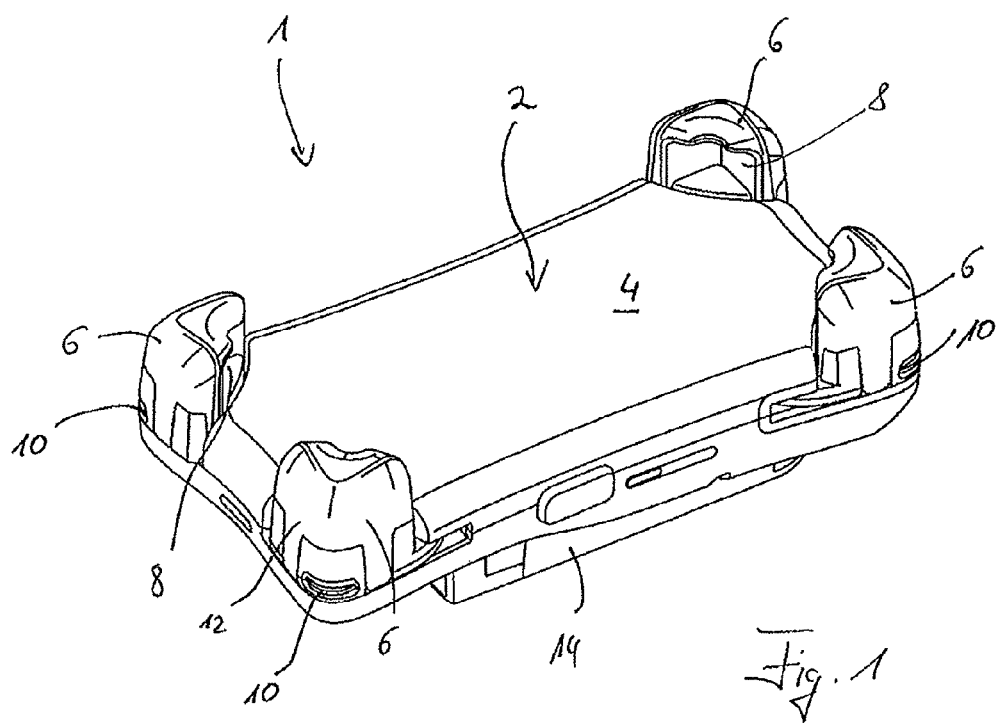
FIG. 1—a holding device according to a first embodiment of the present invention in a schematic 3D view, FIG. 2—a holding device according to an embodiment of the present invention in another schematic 3D view, FIG. 3—a holding device according to an embodiment of the present invention in a third schematic 3D view, FIG. 4—the schematic top view of a holding device according to an embodiment of the present invention with the mounting device in the release position, FIG. 5—the depiction from FIG. 4 with the mounting device in the hold position, FIG. 6—a schematic top view of a holding device according to an embodiment of the present invention with a locked width adjustment, FIG. 7—the depiction from FIG. 6 with an unlocked width adjustment, FIG. 8—a schematic top view of a holding device according to an embodiment of the present invention with a locked length adjustment, FIG. 9—the depiction from FIG. 8 with an unlocked length adjustment, FIG. 10—a 3D view of a holding device according to a further embodiment of the present invention, FIG. 11—the depiction of an adjusting device of a holding component in an exploded view, FIG. 12—the depiction of a holding device according to an embodiment of the present invention in a partially exploded view, FIG. 13—a holding device according to an embodiment of the present invention in an exploded view, FIG. 14—a holding device according to a further embodiment of the present invention, FIG. 15—the holding device from FIG. 14 from another perspective, FIG. 16—the holding device from FIGS. 14 and 15 in a rear view in three different pivoting positions, FIG. 17—a holding device according to an embodiment of the present invention in a partially exploded view, FIG. 18—a holding device according to a further embodiment of the present invention in a partially exploded view and FIG. 19—a rear view of a partially disassembled holding device according to an embodiment of the present invention.
Figure 2:
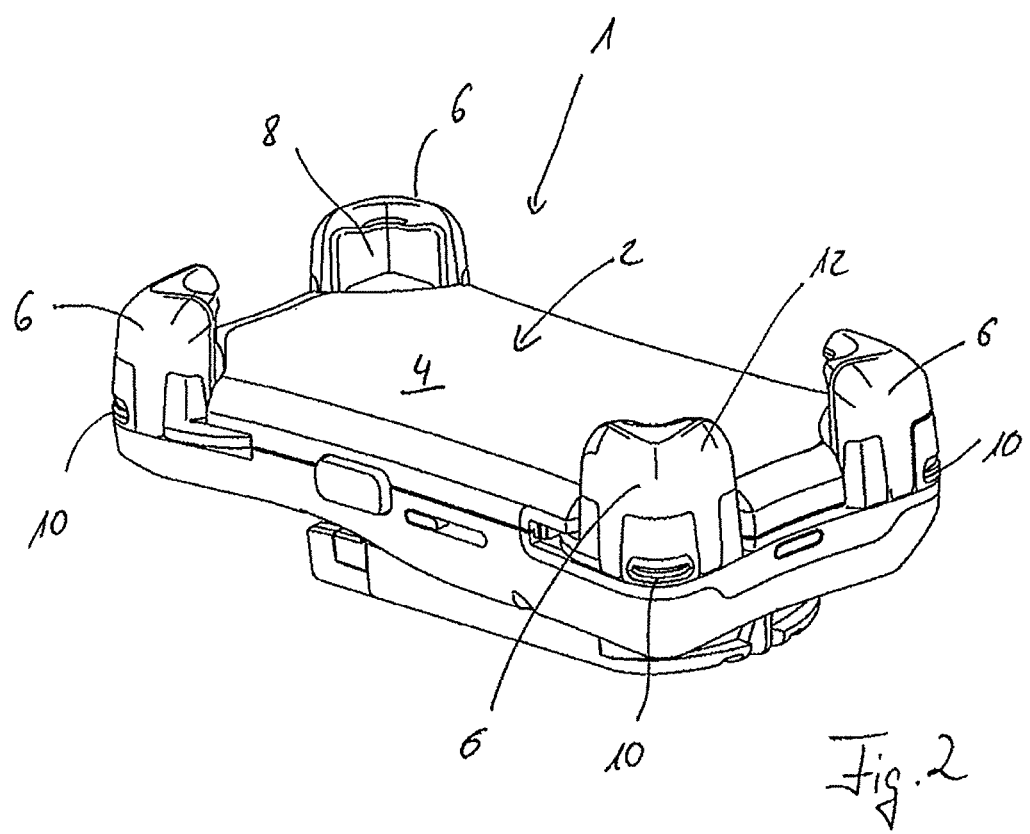
Figure 3:
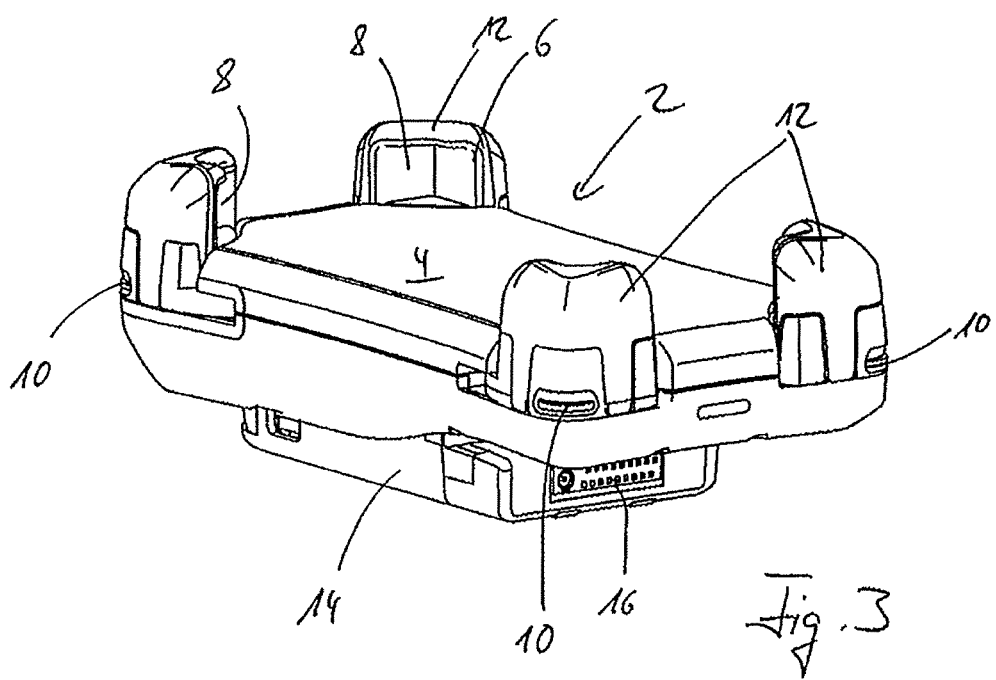

The FIGS. 1 to 3 show a holding device 1 according to an embodiment of the present invention from various angles. The holding device 1 has a mounting device 2, which has a contact surface 4, as well as four holding components as shown in the illustrated embodiment. These are arranged on the corners of the contact surface 4 and thus limit the length and width of the mounting device 2. The height of the mounting device 2 is defined by the recesses 8 in the holding components 6. In FIGS. 1 to 3, these are designed in such a way that they encompass the corners of a mobile telephone placed in the holding device 1, so that a positive interaction occurs. The mounting device 2 depicted in FIGS. 1 to 3 is in the hold position. A mobile telephone which is placed in such a holding device 1 cannot, therefore, be removed from it without changing the mounting device 2 from the hold position depicted to the release position, or causing damage to the holding device 1.

In FIGS. 1 to 3 the mounting device 2 has four holding components 6. Each of these holding components 6 has a cap 12 which can be moved up or down to place it. An adjusting device is provided for this, with which the length L, which essentially corresponds to the height of the recess 8, can be adjusted. In the depicted figures only a setting wheel 10 of this adjusting device can be seen. By means of this setting wheel 10 the cap 12 of each holding component 6 can be separately and individually moved up or down and thus the height of the mounting device 2; as a result the maximum thickness of a mobile telephone to be placed in the mounting device can be individually adjusted at each corner. On the lower side of the holding device 1 depicted in FIGS. 1 to 3 there is an attachment 14, by means of which the holding device 1 can be arranged, for example in a motor vehicle. In particular in FIG. 3 it can be seen that in this attachment 14, connectors 16 for communication units, power supply etc. can be provided. In this way a mobile telephone placed in the holding device 1 is provided with power, for example, and connected to an available hands-free device in the vehicle, if necessary.

Figure 4:
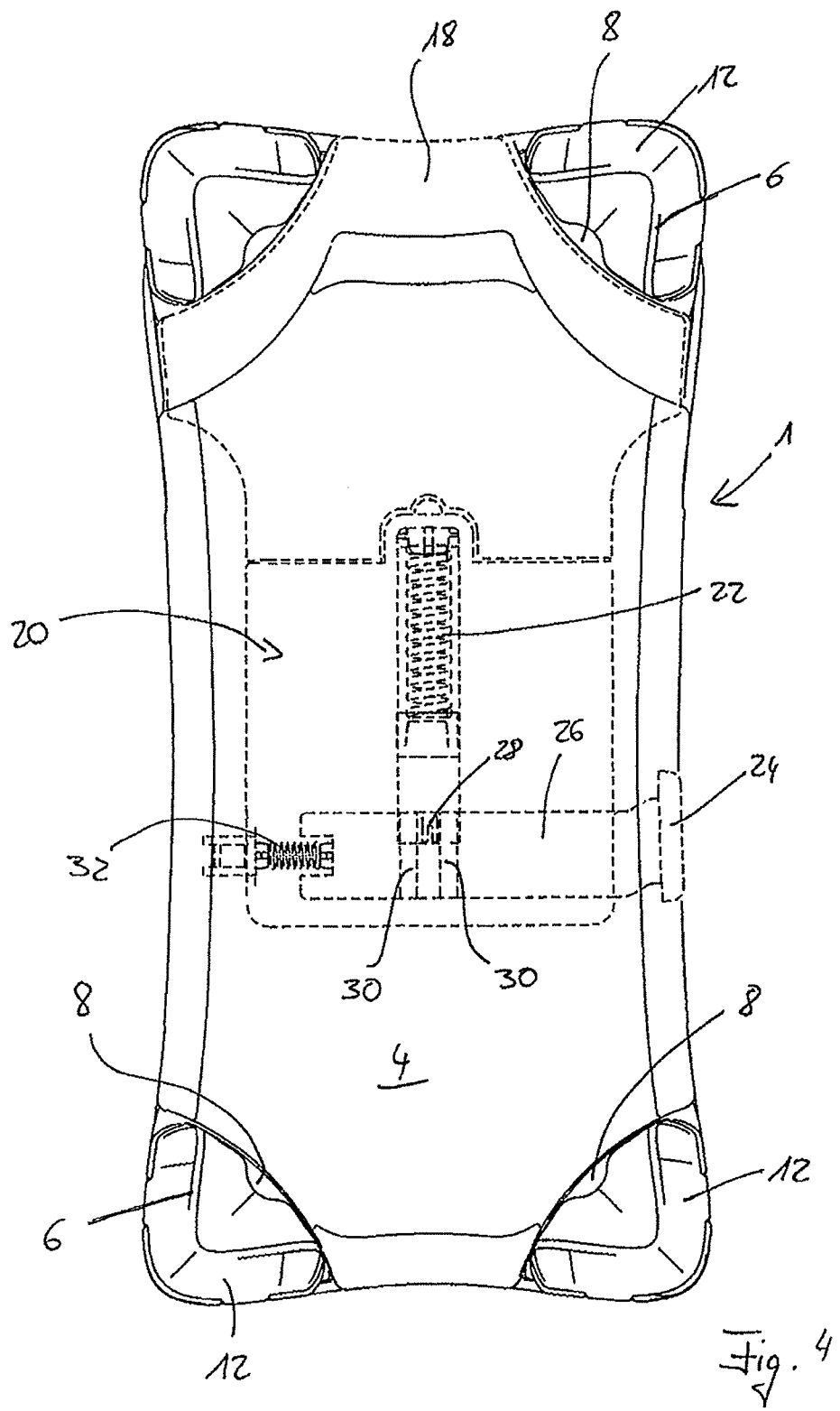

FIG. 4 shows the top view of a holding device 1 according to an embodiment of the present invention. In this diagram, the component parts depicted with a solid line, can be seen from above, while the component parts depicted with a dotted line are concealed under the contact surface 4. The holding device shown in FIG. 4 has a mounting device 2 in the release position. It can be seen that a sliding component 18 in FIG. 4 protrudes upwards above the contact surface 4. As a result, the distance between the two upper and the two lower holding components 6 is greater than the length of the mobile phone to be placed in the holding device 1. It can thus be easily mounted.

Underneath the contact surface 4 is a locking device 20, which can therefore not be seen and is thus depicted with a dotted line. The sliding element 18 can be moved downwards in FIG. 4 in order to change the mounting device 2 from the release position shown in FIG. 4 to the hold position shown in FIG. 5. For this purpose a first spring 22 must be compressed.

In FIG. 4 a button 24 can be seen which forms one end of a guide component 26. On this guide component 26 are two side walls 30 between which a protrusion 28 is mounted which can thus only be moved upwards or downwards in FIG. 4. The protrusion 28 is moved if the sliding component 18 is moved against the spring force of the first spring 22 in FIG. 4. Should the sliding component 18 be moved down enough, the protrusion 28 will leave the two side walls 30 and the guide element 26 can be moved to the right by the spring force of a second spring 32. As a result the guide element is moved exactly so far to the right that the protrusion 28 no longer lies between the two side walls 30, but instead underneath one of the side walls 30 in FIGS. 4 and 5, so that an upward movement of the sliding component 18 as a result of the spring force of the first spring 22 is no longer possible.

Figure 5:
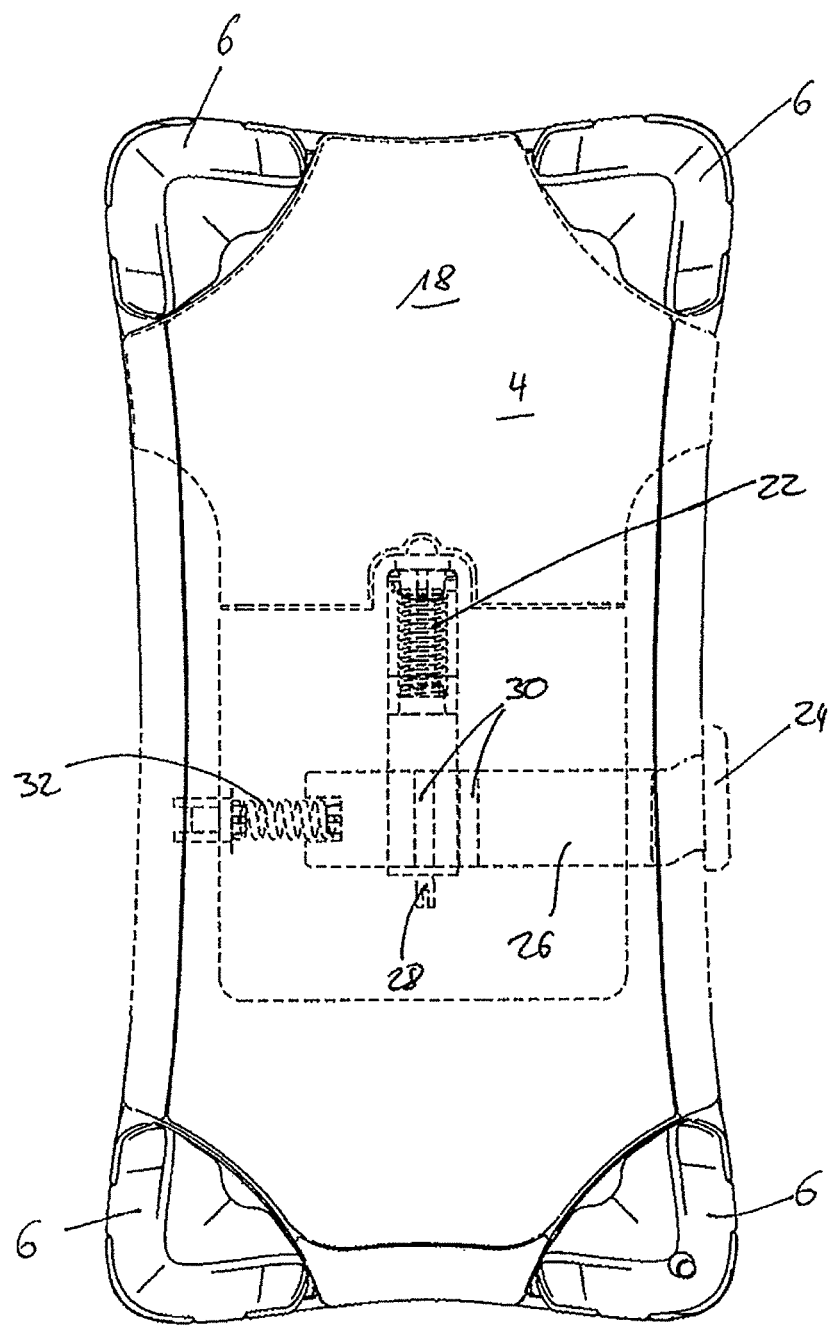

This situation is shown in FIG. 5. The mounting device 2 can be seen, which is in the hold position. The first spring 22 has been compressed by pushing in the sliding component 18, which is now completely underneath the contact surface 4. The protrusion 28 has therefore left the two side walls 30, so that the second spring 32 could loosen and the guide component 26 could be moved to the right with the button 24 fixed onto it. The protrusion 28 now lies flat in FIG. 5 underneath the left-hand side wall 30 and can therefore not be moved upwards.

In order to move the receiver device 2 from the hold position in FIG. 5 to the release position again, only the button 24 and therefore the guide component 26 must be moved gently to the left. The protrusion 28 then returns to in between the two side walls 30, so that the first spring 22 can loosen and ensures an upward movement of the sliding component 18. As a result, the distance between the two upper and left holding components 6 is also increased again, so that a mobile telephone placed in the holding device 1 can be removed without any problems.

FIG. 6 again shows a schematic top view of a holding device 1 according to an embodiment of the present invention.

The mounting device 2 is in the hold position; in the depicted embodiment, for example, it can be seen that the button 24 protrudes to the right above the contact surface 4, like in FIG. 5.

Figure 6:
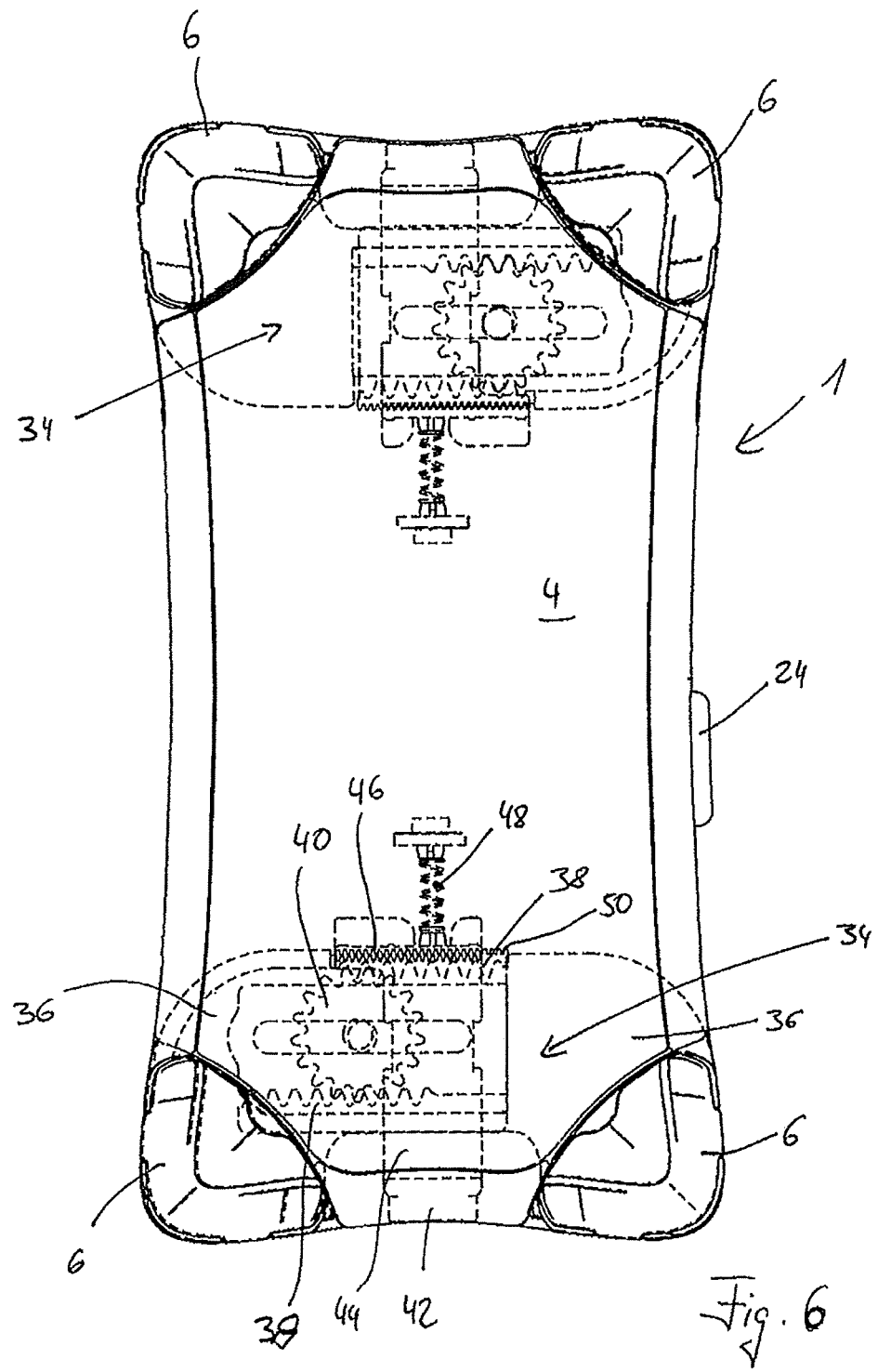

In FIG. 6, component parts which are underneath the contact surface 4, and thus cannot actually be seen, are again depicted with dotted lines. This refers to two width adjusting devices 34. To this effect, one of the two width adjusting devices 34 is intended for two holding components, i.e. for either the two upper or the two lower holding components 6. Since both width adjusting devices 34 are identically constructed, the principle will only be explained by means of the lower width adjusting device 34.

Each of the two lower holding components 6 is coupled with a connecting element 36. Each of these connecting elements 36 has a rack element 38. Both rack elements 38 of the connecting element 36 mesh with a common gear wheel 40.

Figure 7:
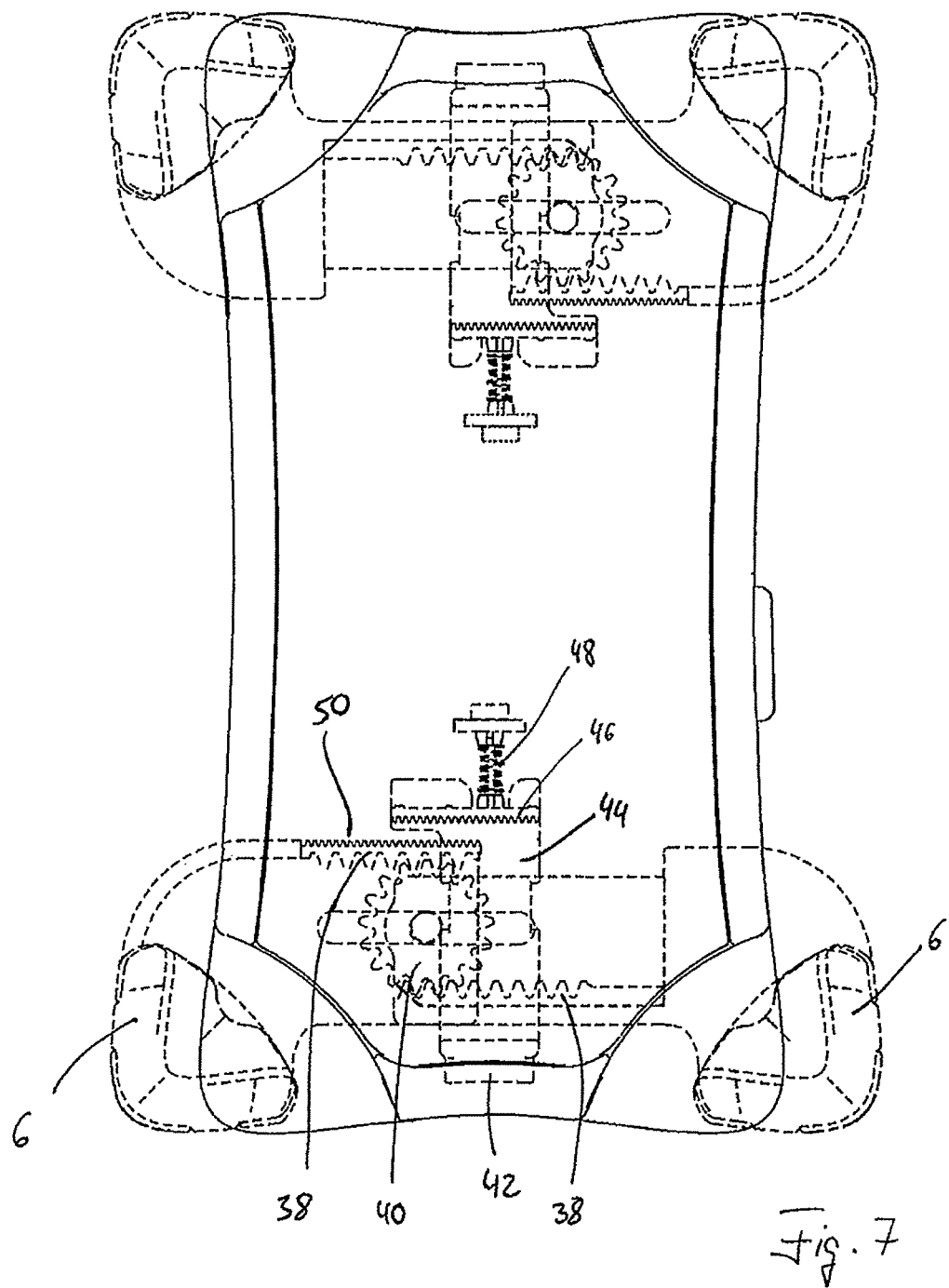

FIG. 6 shows the width adjusting device 34 in the locked position. A second button 42, which is connected to a second guide component 44, upon which a first rack element 46 is arranged, can be moved upwards against the spring force of a third spring 48 in FIG. 6. In FIG. 6 the first rack element 46 meshes with a purpose made serrated rack 50 provided on the connecting elements 36. When the button 42 in FIG. 6 is moved upwards, this meshing is disconnected. This situation is depicted in FIG. 7. It can be seen that the button 42 was moved upwards. As a result, the second guide element 44 and the first rack element 46 are also moved. This happens against the force of the third spring 48. Once the first rack element 46 and the serrated rack 50 no longer mesh with one another, the two lower holding components 6, as shown in FIG. 7, can be moved outwards. By doing so, the rack elements 38 catch in the gear wheel 40, which rotates as a result. In this way, the width of the mounting component 2—i.e. the distance between the two lower holding components 6—can be freely adjusted and in particular adapted to the width of the mobile telephone to be mounted. The second width adjusting device 34, which is intended for the two upper holding components 6 in FIGS. 6 and 7, is structurally identical. A repeated description is therefore unnecessary.

Figure 8:
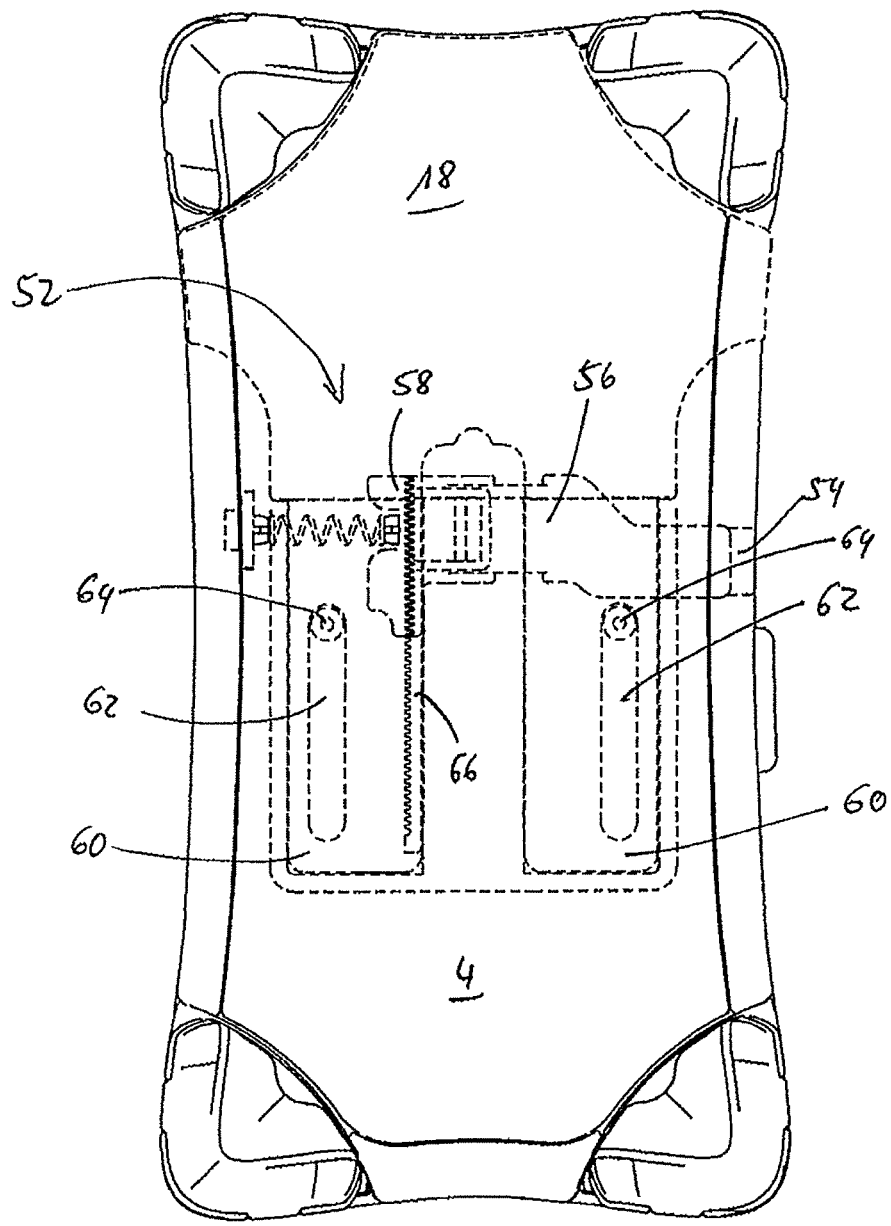

FIG. 8 shows a top view of a holding device 1 according to an embodiment of the present invention wherein a length adjusting device 52 is depicted by a dotted line. A third button 54 is connected to a third guide element 56. A second rack element 58 is arranged on this. The sliding component 18 is found underneath the contact surface 4. This has two limbs 60, which respectively have a slot 62, in each of which a pin 64 is arranged. Furthermore a second serrated rack 66 is found on a limb 60.

Figure 9:
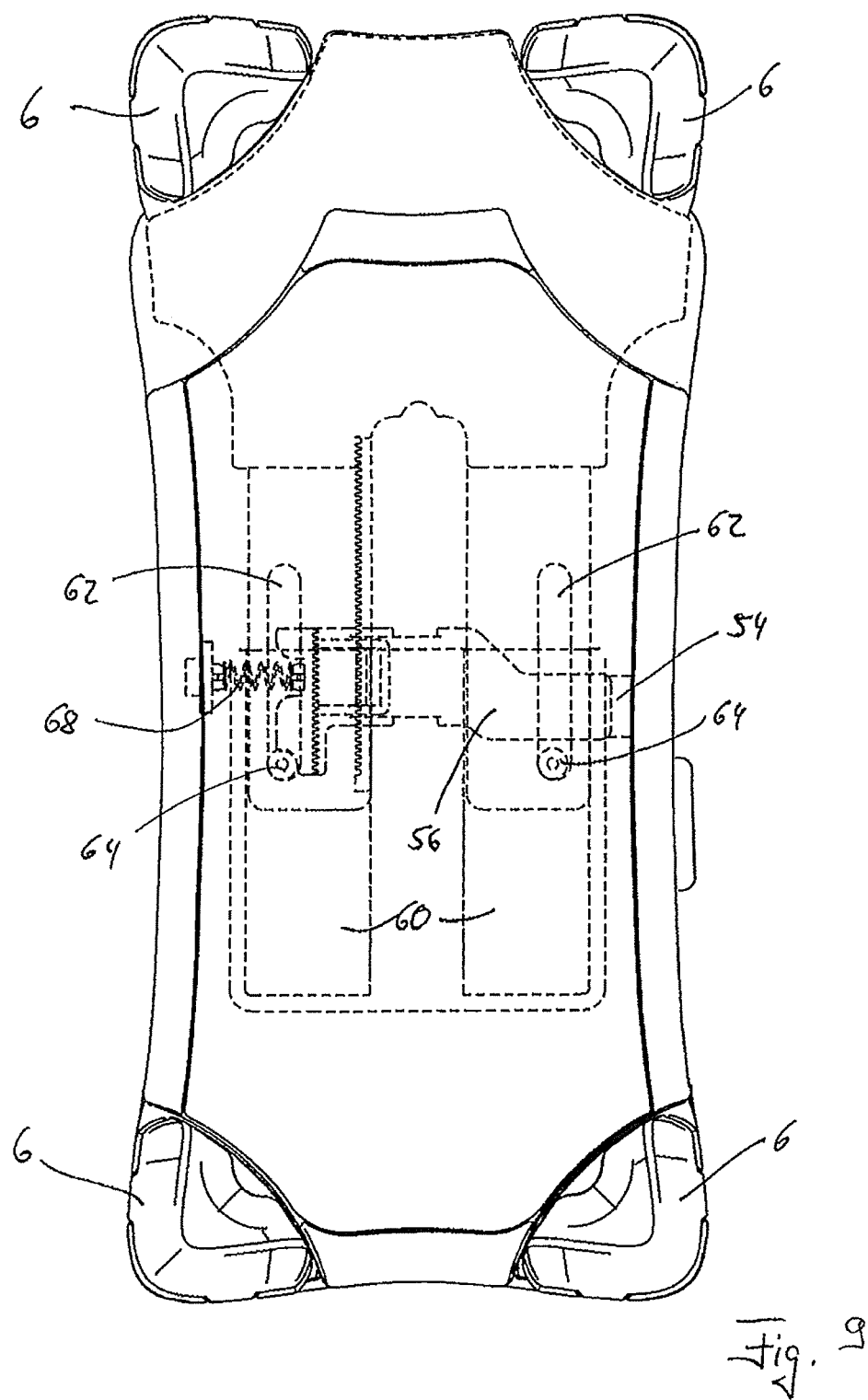

In FIG. 8, the second rack element 58 meshes with the second serrated rack 66. A relative movement between the contact surface 4 and the sliding component 18 is therefore not possible in this arrangement. Should the third button 54 in FIG. 8 now be moved to the left, the second rack element 58 will no longer mesh with the second serrated rack 66, so that the two component parts can be moved relative to one another. This situation is depicted in FIG. 9. The movement of the third guide element 56 is thus spring loaded by a fourth spring 68. As soon as the third button 54 is released, the third guide element, as a result of the spring force of the fourth spring 68, is put back to the original position again, so that the second rack element 58 and the second serrated rack 66 mesh with one another again. In this way the length of the mounting device 2—i.e. the distance between the two left and the two right holding components 6—can be adjusted.

Figure 10:
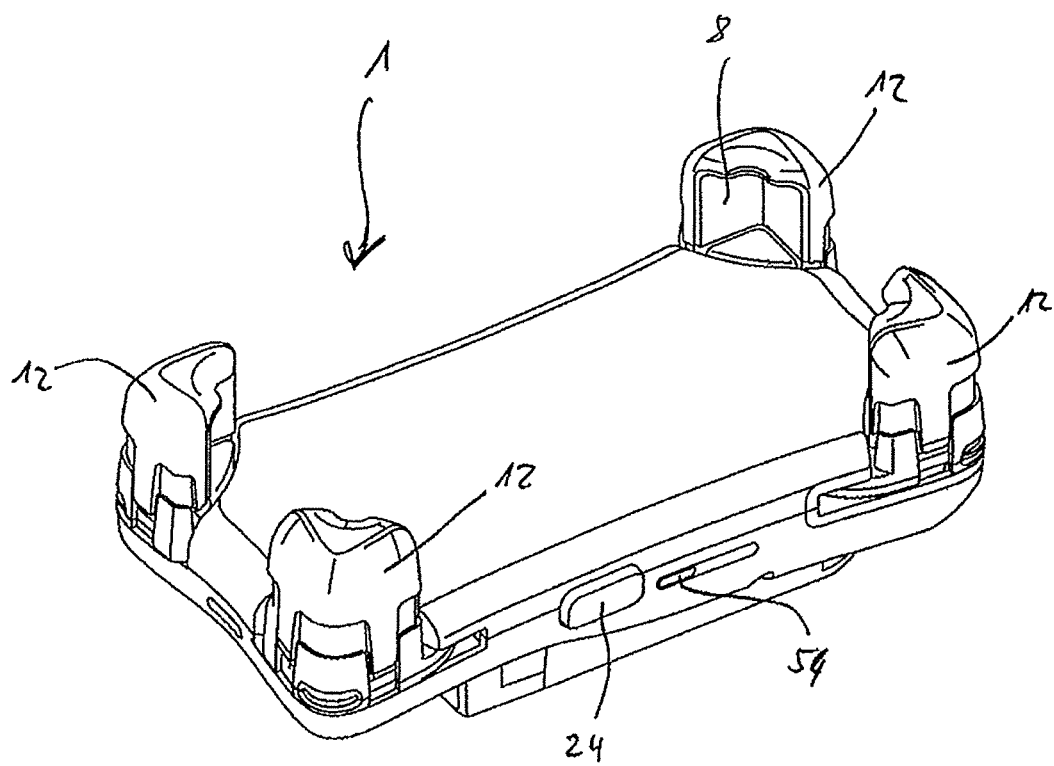

FIG. 10 shows a holding device 1 according to an embodiment of the present invention. The four holding components 6 arranged on the corners each have a cap 12, which can be moved upwards or downwards by means of an adjusting device. In the situation depicted in FIG. 10, the cap 12 is arranged respectively in its end position. As a result the height of the recess 8 and thus the height of the mounting device and thus the length is at a maximum, so that a mobile telephone with the largest possible thickness can be mounted in the mounting device 2 of the holding device 1. On the side surface of the holding device 1 shown in FIG. 10, the button 24 can be seen, which can be used for the unlocking of the unlocking device 20, if the mounting device 2 should be transferred from the hold position shown in FIG. 10 to the release position. Furthermore, the third button 54 can be seen, with which the setting of the length of the mounting device 2 can be adjusted.

Figure 11:
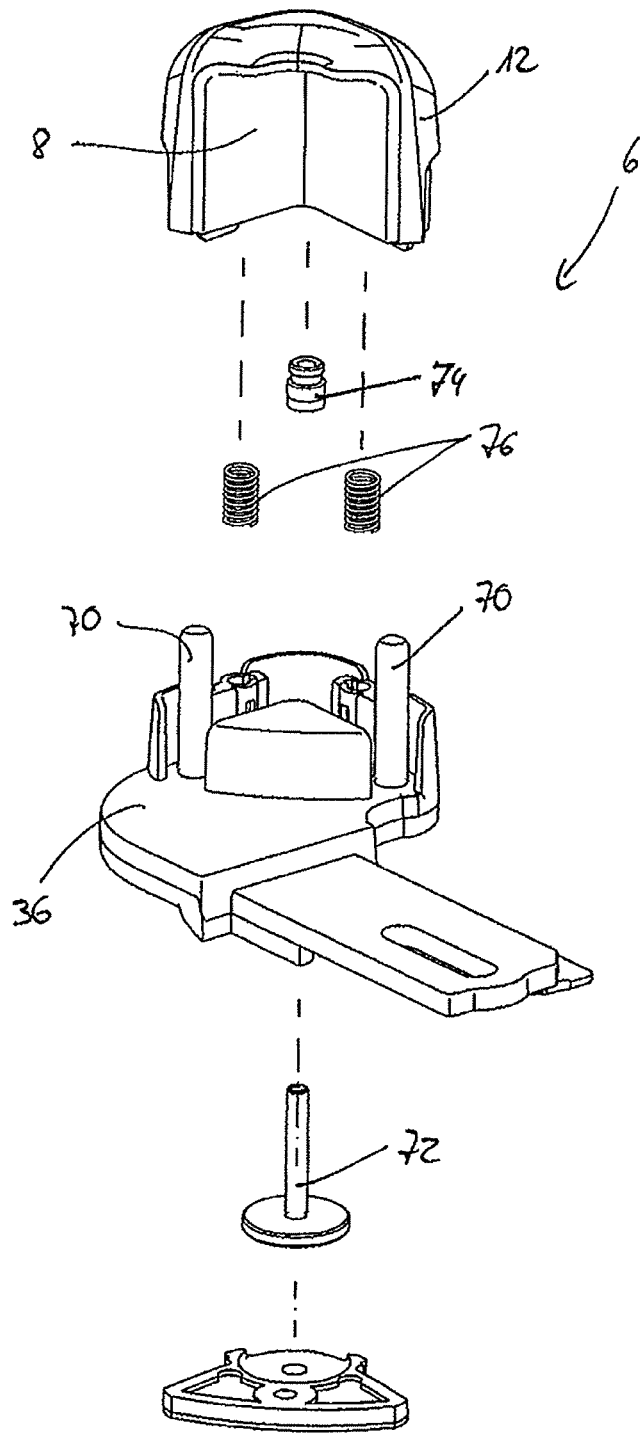

FIG. 11 shows a holding device 6 in an exploded view. The cap 12 can be seen, which is arranged on the connecting element 36 via a supporting pin 70. A knurled-head screw 72, which fits into a nut 74 arranged underneath the cap 12, is guided into the connecting element 36 via a recess. Should the knurled-head screw 72 now be rotated in such a way that the nut 74 on the knurled-head screw 72 moves upwards, the cap 12 also moves upwards because of the force of the two springs 76. In this way the height of the cap 12 and thus the height of the recess 8 can be freely adjusted. The height of the mounting device 2 is also thereby adjusted.

Figure 12:
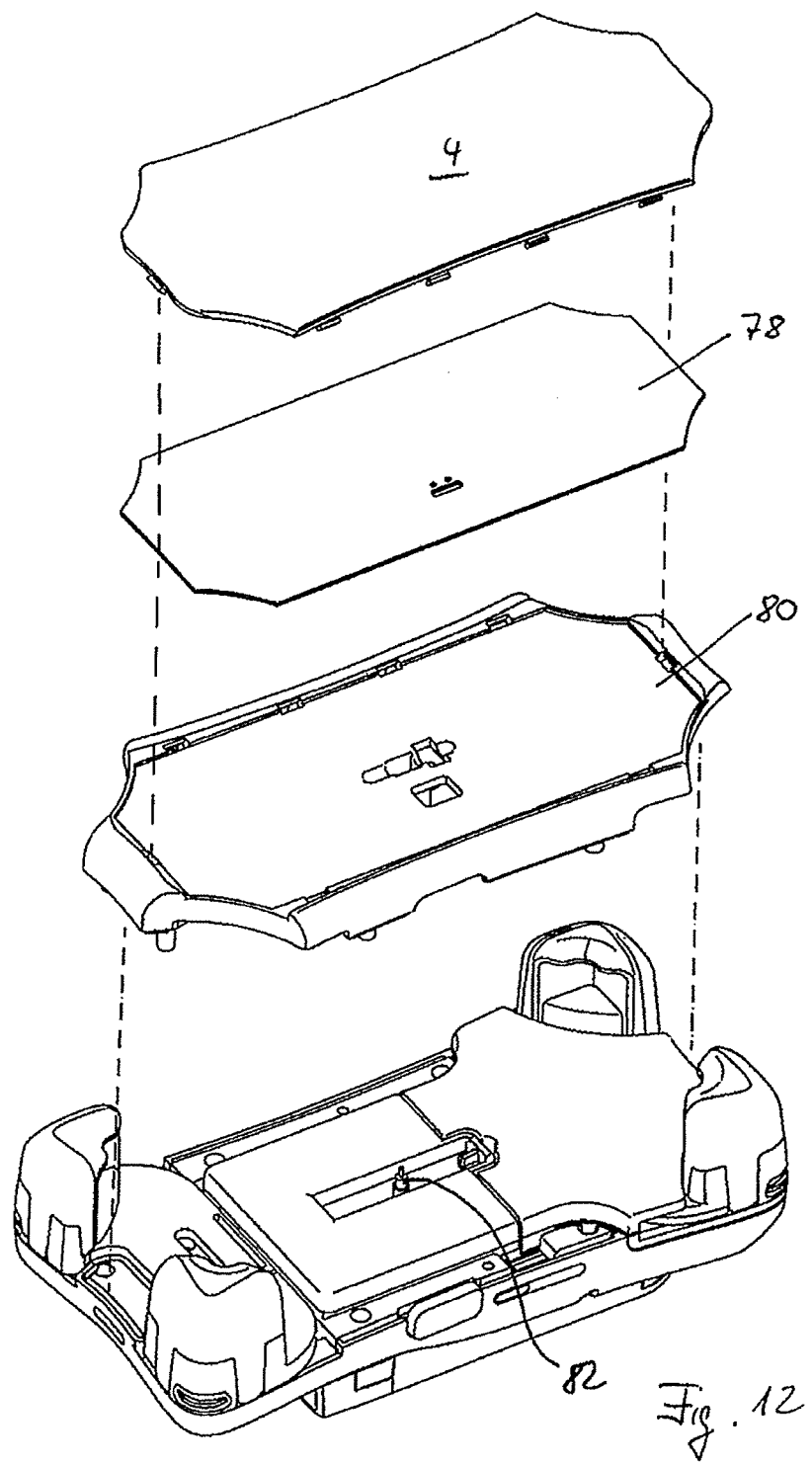

FIG. 12 shows a schematic view of a holding device 1 according to an embodiment of the present invention in a partially exploded view. The contact surface 4 can be seen, with a universal antenna coupler 78 arranged underneath it, which lies flat on a support plate 80 that is connected with the rest of the holding device 1. By means of this, the universal antenna coupler 78 has contact to the end of an antenna cable connection 82, which protrudes out of the holding device 1 from underneath.

Figure 13:
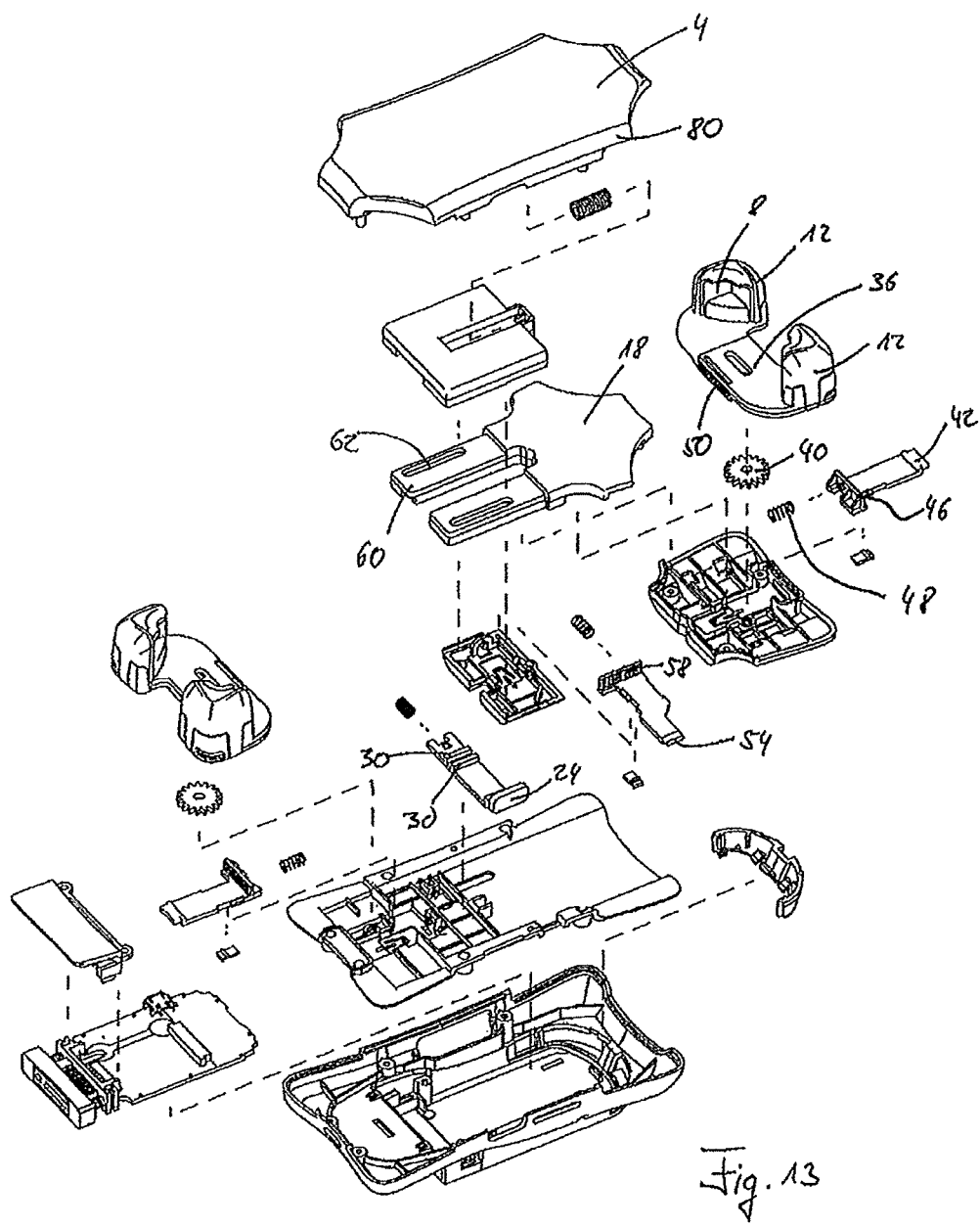

FIG. 13 shows a holding device 1 according to an embodiment of the present invention in an exploded view. Since the functioning and arrangement of the relevant mechanisms have already been explained, a repeated explanation is unnecessary.

Figure 14:
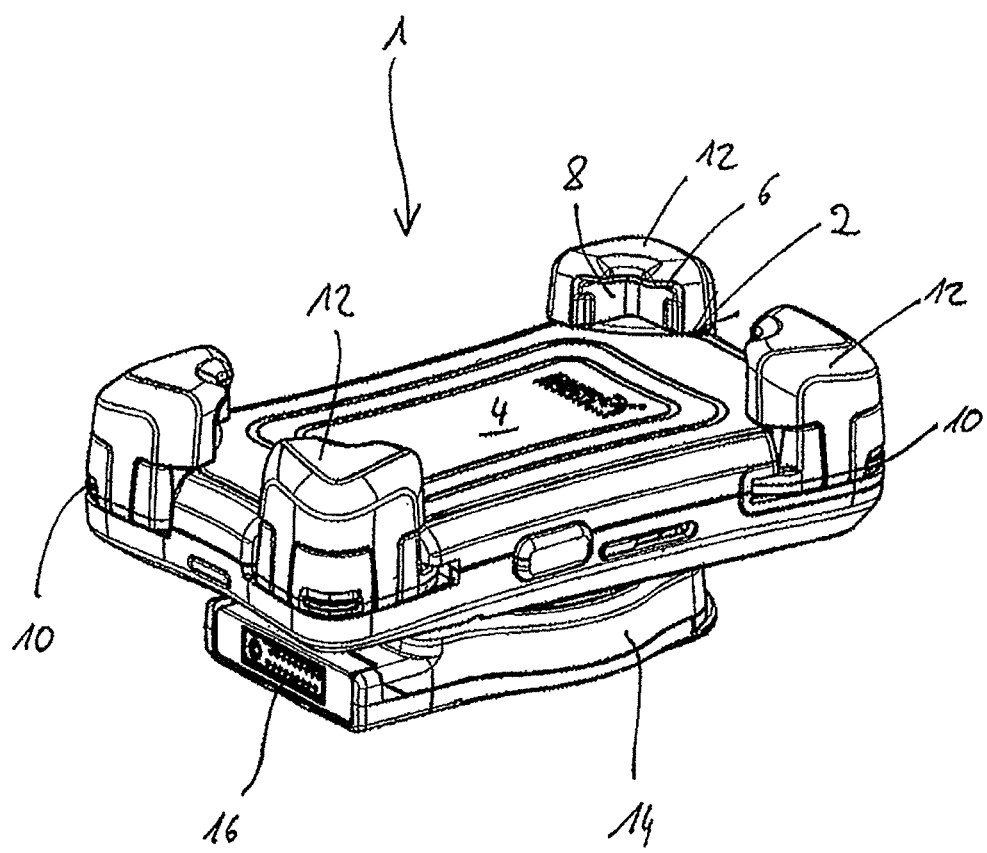

FIG. 14 shows a holding device 1 according to another embodiment of the present invention. The difference to the embodiments depicted in FIGS. 1 to 3 lies in the rotation capacity of the attachment 14 relative to the mounting device 2. The attachment 14 can be pivoted relative to the mounting device 2 around a pivot axis, which stands perpendicular to the contact surface 4. As a result, the various pivoting positions can be achieved, so that the use of a mobile telephone in a vertical and horizontal arrangement is possible.

Figure 15:
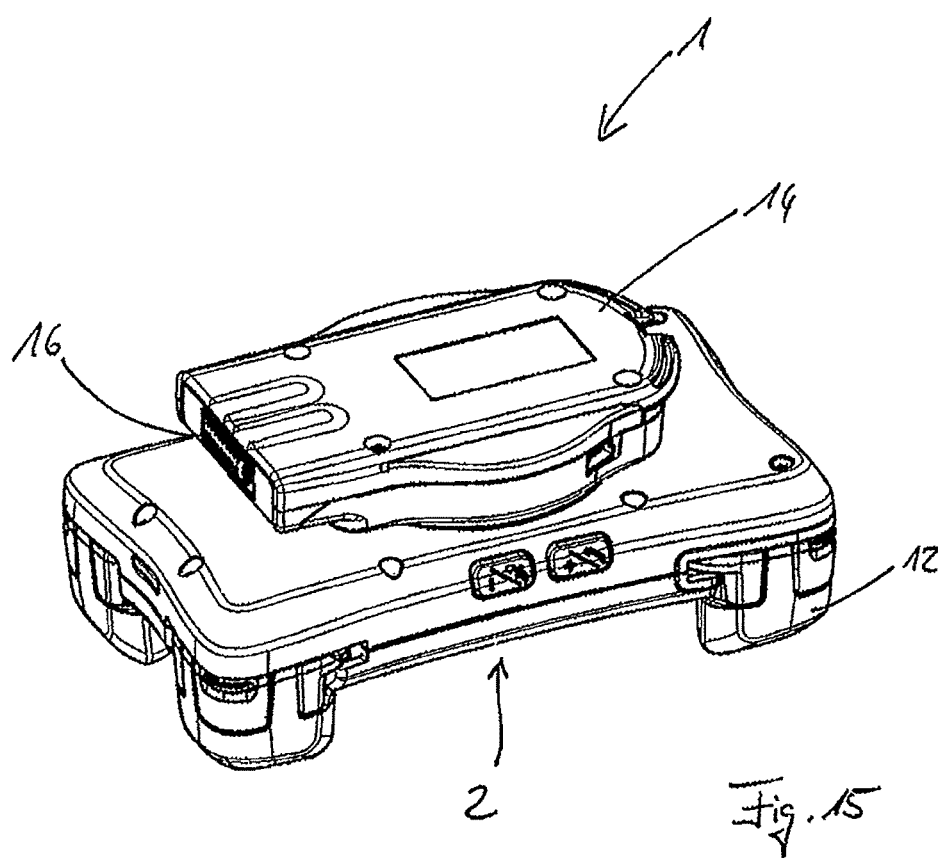

FIG. 15 shows the holding device 1 from FIG. 14 from another perspective. The attachment 14 is mounted in such a way that it can pivot relative to the mounting device 2.

Figure 16:
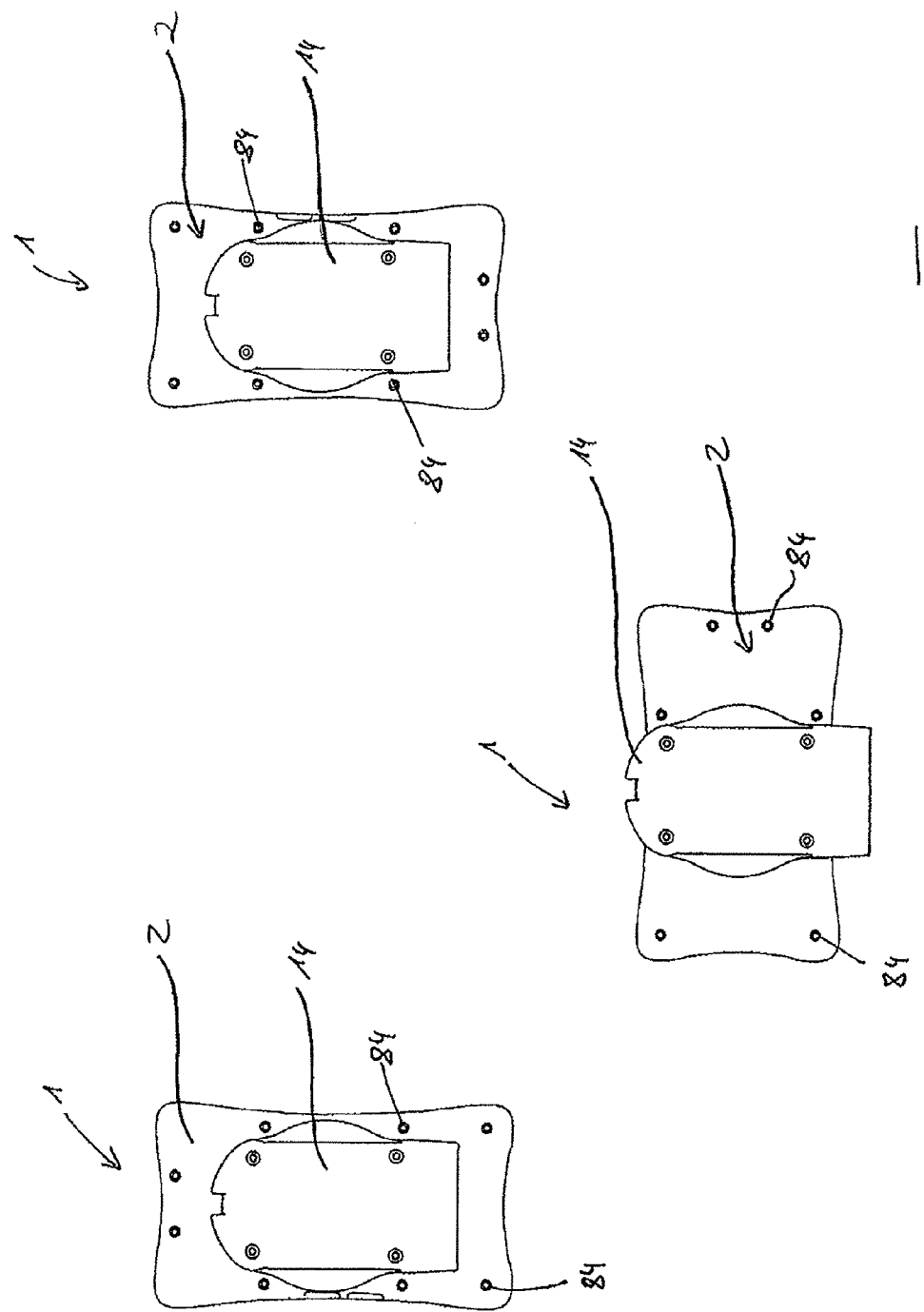

FIG. 16 shows the holding device 1 in a rear view in three different pivoting positions. In the middle part of FIG. 16 the holding device 1 is depicted in the neutral position. The attachment 14 and the mounting device 1 are thereby arranged together in such a way that the mounting device 2 in the embodiment shown is arranged in the horizontal arrangement in the neutral position. A mobile telephone that is in this neutral position in the holding device 1 is consequently used in the horizontal format. From this neutral position, the mounting device 2 can be pivoted relative to the attachment around a pivoting axis, which stands perpendicular to the drawing on the paper in the embodiment shown. Should the mounting device 2 be rotated 90° in a clockwise direction relative to the attachment 14, the arrangement depicted in the right hand part of FIG. 16 is maintained. It can be seen that a mobile telephone that is in the mounting device 2 is now used in a vertical arrangement. However, should the mounting device 2 be turned 90° in an anti-clockwise direction out of the neutral position shown in the middle part of FIG. 16, the second pivoting position depicted in the left hand part of FIG. 16 is maintained. In this case, the mobile telephone that is in the mounting device 2 is now also used in an upright position. However, it can be seen in the arrangement of screw recesses 84 that the first pivoting position and the second pivoting position are rotated 180° against one another.

Figure 17:
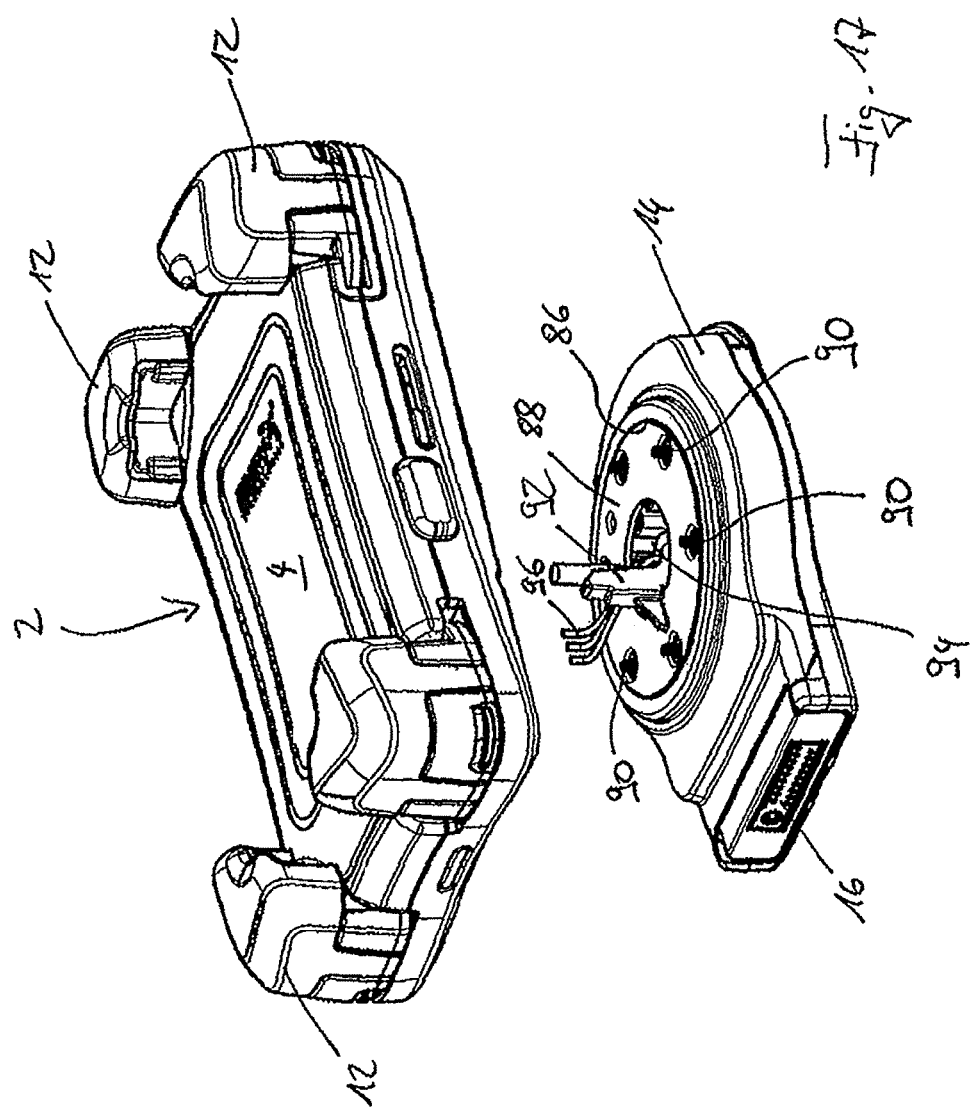

FIG. 17 shows the depiction from FIG. 14 in a partially exploded view. The mounting device 2 with the caps 12 and the contact surface 4, into which the mobile telephone can be inserted, can be seen in the upper part of the diagram. In the lower part of FIG. 17 is the attachment 14 with the at least one connector 16. The attachment 14 has a circular recess 86 in the side facing upwards shown in FIG. 14, in which a first rotary component 88 is found in FIG. 17. This is tightly connected with the mounting device 2 by means of screws 90 as well as a pin 92 which protrudes upwards. Via a middle recess 94 that is found on the first rotary element 88, cables 96 can be guided into the mounting device 2.

Figure 18:
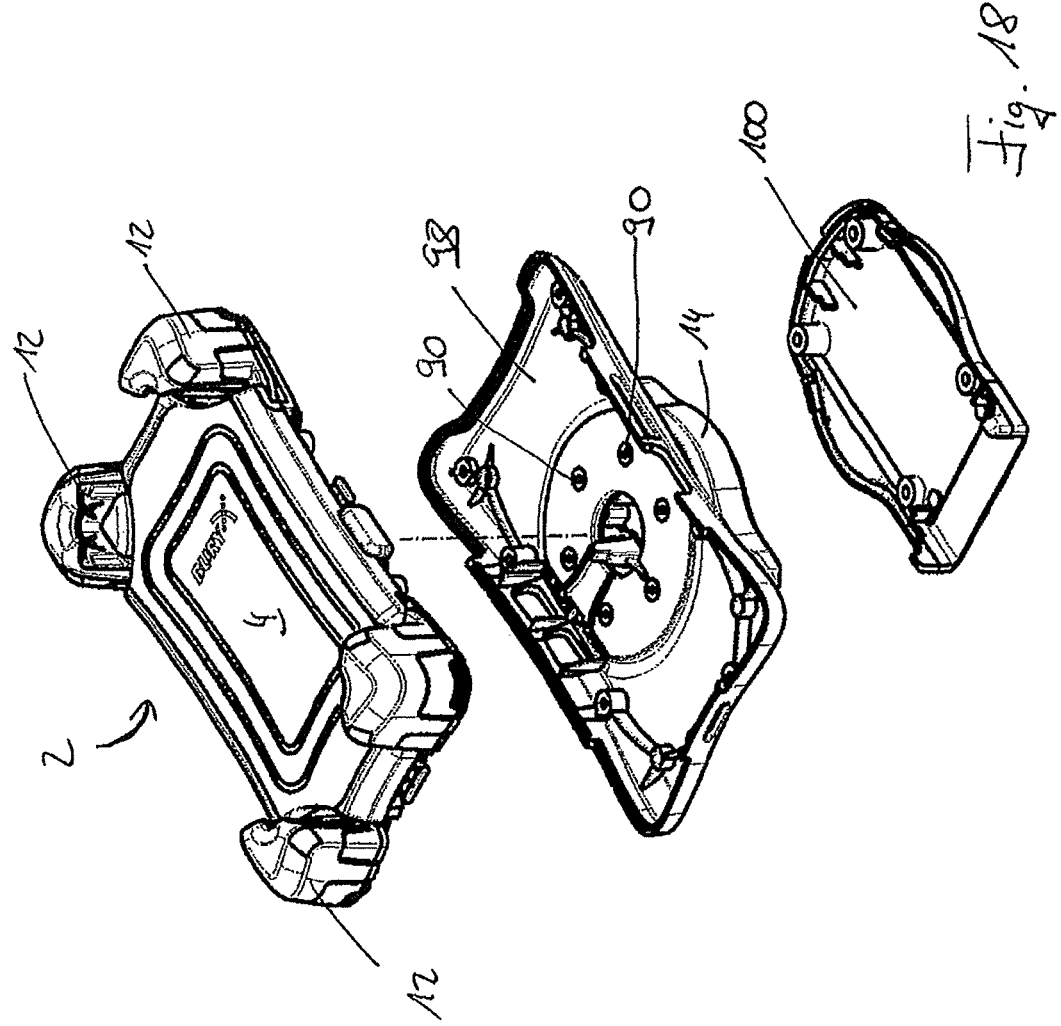

FIG. 18 shows the holding device from FIG. 17 in a partially exploded view. In the upper part is the mounting device 2, which again has caps 12 and a contact surface. A shell 98 is found underneath this, on which the first rotary component 88 is tightly fixed by means of the screws 90. The attachment 14 is closed with an end cap 100.

Figure 19:
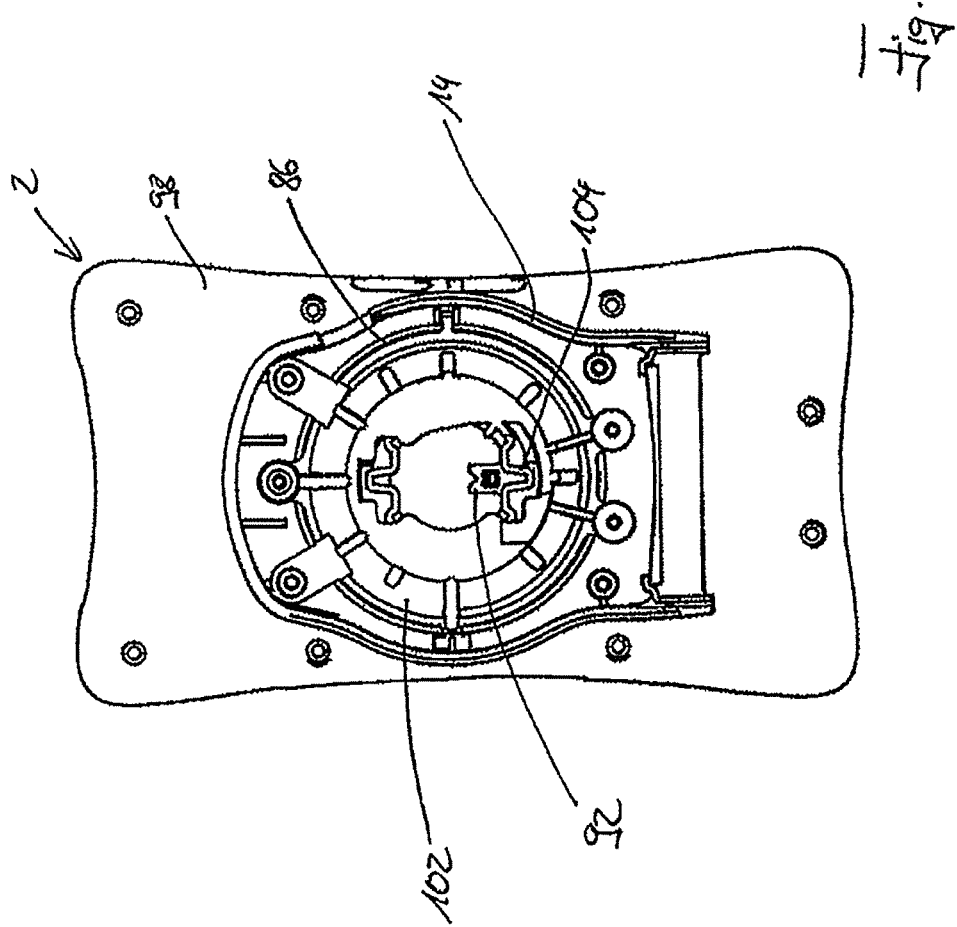

FIG. 19 shows a view of a holding device 1 according to an embodiment of the present invention in which the end cap 100 has been removed. The shell 98 can be seen, which covers the mounting device 2 from below. The attachment 14 is found on this, in which there is a recess 86, in which the first rotary component 88 can rotate. In FIG. 19 the pin 92 from this in particular is depicted, which allows for a simple alignment of the first rotary component 88 on the underside of the shell 98. The first rotary component 88 is tightly arranged on the underside of the shell 98, but mounted inside the recess 86 in the attachment 14 in such a way that it can be rotated. Inside the attachment 14 is a second rotary component 102, which is tightly fixed to the attachment 14 and in such a way that it can pivot relative to the first rotary component 88. The snap-in components are found on this, which can lock into the purpose made recesses—not depicted in FIG. 19—as long as the mounting device 2 is in one of the fixable pivoting positions relative to the attachment 14.

REFERENCE NUMERALS

1 Holding device
2 Mounting device
4 Contact surface
6 Holding component
8 Recess
10 Setting wheel
12 Cap
14 Attachment
16 Connectors
18 Sliding components
20 Locking device
22 Primary spring
24 Button
26 Guide component
28 Protrusion
30 Side/lateral wall
32 Secondary spring
34 Width adjusting device
36 Connecting element
38 Rack element
40 Gear wheel
42 Secondary key
44 Secondary guide component
46 Primary rack element
48 Third spring
50 Serrated rack
52 Length adjusting device
54 Third key
56 Third guide component
58 Secondary rack element
60 Limb
62 Slot
64 Pin
66 Secondary rack element
68 Fourth spring
70 Supporting pin
72 Knurled-head screw
74 Screw nut
76 Spring
78 Universal antenna coupler
80 Support plate
82 Antenna cable connection
84 Screw recess
86 Recess
88 Primary rotary component
90 Screw
92 Pin
94 Middle recess
96 Cable
98 Shell
100 End cap
102 Secondary rotary component
104 Snap-in component

The invention claimed is:

1. Holding device for a mobile telephone, comprising:
a mounting device for accommodating the mobile telephone, the mounting device comprising a contact surface and at least two holding components which protrude from the contact surface, wherein each of the holding components has an adjusting device for adjusting a length L which extends in a direction perpendicular to the contact surface, and wherein the mounting device can be put in a hold position and a release position, wherein the mounting device is arranged to interact positively with a mobile telephone mounted in the holding device when the mounting device is in the hold position.

2. Holding device according to claim 1, wherein the mounting device comprises four holding components which are arranged on four corners of the mounting device.

3. Holding device according to claim 1, wherein said adjusting device includes a common adjusting device, and wherein a number of said at least two holding components that is at least a plurality are associated with said common adjusting device, by means of which the length L of this number of holding components can be adjusted together.

4. Holding device according to claim 1, wherein the adjusting device comprises a knurled-head screw.

5. Holding device according to claim 1, further comprising a width adjusting device for adjusting a width of the mounting device.

6. Holding device according to claim 1, further comprising a length adjusting device for adjusting a length of the mounting device.

7. Holding device according to claim 1, further comprising a locking device to lock the mounting device in the hold position.

8. Holding device according to claim 1, further comprising a universal antenna.

9. Holding device according to claim 1, further comprising a mini USB connection.

10. Holding device according to claim 1, further comprising an attachment on one side opposite to the mounting device for fixing the holding device, wherein the mounting device is mounted in such a way that it can be pivoted around a pivot axis relative to the attachment.

11. Holding device according to claim 10, wherein the pivot axis runs perpendicular to the contact surface.

12. Holding device according to claim 10, further comprising snap-in components for fixing the mounting device in at least one pivoting position relative to the attachment.

13. Holding device according to claim 12, wherein the mounting device can be fixed in three pivoting positions relative to the attachment, wherein the three pivoting positions comprise a neutral position, a primary pivoting position at +90° to the neutral position, and a secondary pivoting position at −90° to the neutral position.

14. Holding device according to claim 10, further comprising at least one connector for a communication device and/or a power supply arranged on the attachment.

15. Holding device according to claim 1 wherein said adjusting device adjusts the length L steplessly.

\* \* \* \* \*